United States Patent [19]

Kiczek

[11] Patent Number: 4,992,289

[45] Date of Patent: Feb. 12, 1991

[54] METHOD FOR OPENING A MOLLUSK

[75] Inventor: Edward F. Kiczek, Long Valley, N.J.

[73] Assignee: Air Products and Chemicals, Inc., Allentown, Pa.

[21] Appl. No.: 422,845

[22] Filed: Oct. 17, 1989

[51] Int. Cl.$^5$ .................. A23L 1/00; F25D 17/00
[52] U.S. Cl. ...................... 426/479; 62/64; 62/374; 426/524
[58] Field of Search .............. 426/479, 524; 62/63, 62/64, 374; 17/48

[56] References Cited

U.S. PATENT DOCUMENTS

| 2,824,006 | 2/1958 | Strasburger | 99/111 |
| 3,007,801 | 11/1961 | Lapeyre | 99/195 |
| 3,965,270 | 6/1976 | Epstein | 62/64 |
| 4,236,276 | 12/1980 | Twuyver | 17/48 |

Primary Examiner—George Yeung
Attorney, Agent, or Firm—James C. Simmons; William F. Marsh

[57] ABSTRACT

Method and apparatus for opening a mollusk (e.g., oysters) by rapidly cooling said mollusk to a surface temperature of about −100° F. followed by mechanically agitating said mollusk whereby the mollusk shell opens and at least one eye of the mollusk meat is detached from the shell. Subsequent to cooling and prior to agitating, the mollusk can be rapidly immersed in a water bath to raise the surface temperature of the mollusk to no more than about −50° F. Individually quick frozen mollusk meat can be prepared rapidly either as an individual portion of meat or on the half shell.

17 Claims, 2 Drawing Sheets

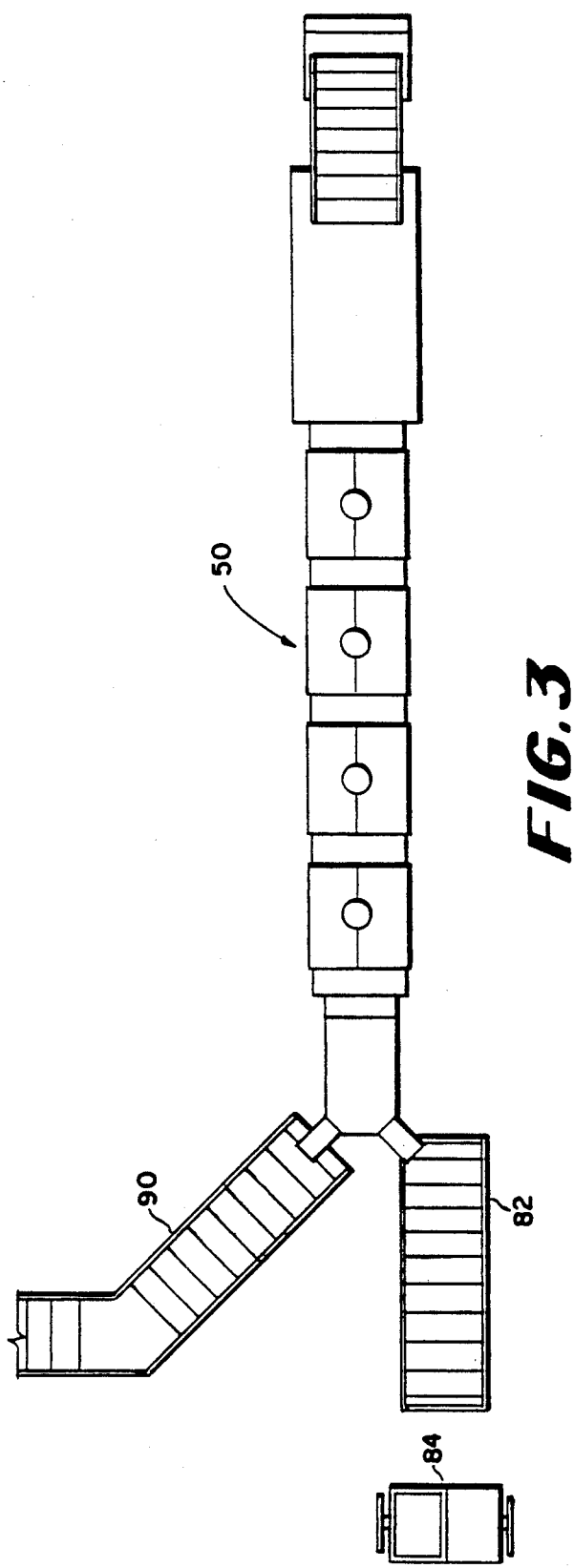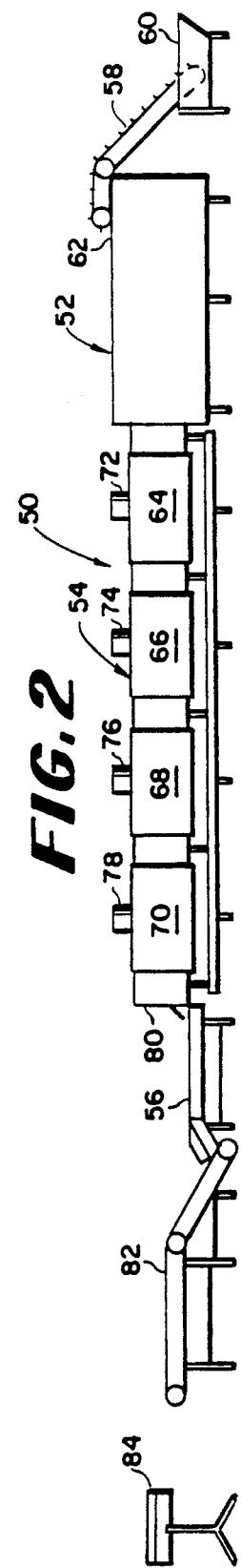

METHOD FOR OPENING A MOLLUSK

TECHNICAL FIELD

The present invention relates to processing of mollusks and in particular to the processing of oysters to provide easy opening of the mollusks and to provide individually quick frozen pieces of mollusk either alone or on the half-shell.

BACKGROUND OF THE INVENTION

The present invention relates to the opening of bivalve mollusks to recover the meat of an individual mollusk either alone or in association with half of the shell. Mollusks of interest are oysters, clams, mussels and scallops.

In the case of the oyster, it will close and seal its shell in the presence of a mechanical disturbance, change in light or substances that would tend to irritate the meaty portion of the oyster. When the oyster closes its shell the adductor muscle, sometimes called the eye which passes through the body to connect the two halves of the shell, contracts and pulls the two halves of the shell together. When oysters are removed from the water and they are in a closed condition, they will retain water and can survive for various periods of time depending upon the temperature at which they are stored. However, if the oyster is warm or it is handled roughly, the adductor muscle tends to relax the halves of the shell gap, water is lost, and the oyster will die. Normally a great deal of force and mechanical manipulation is required to open a fresh oyster.

When the oyster shell is opened it immediately begins to lose much of its juice and liquid with a consequent loss of weight and flavor. Therefore, oysters are eaten immediately after the shells are opened to provide the best taste experience for the consumer.

Current methods of opening oysters and other mollusks is very labor intensive and may require grinding of the shell and the use of a special knife to pry open the shell. After opening the mollusk the meat which is attached to the shell must be removed. In the case of the oyster the eye or the membrane that attaches the meat to the top and bottom shells must be cut. If the membrane is not cut properly the meat can be ruined. Since oysters are wet, sharp instruments must be used, labor costs can be high, production can be low and worker injury is common.

Other processes used to open mollusks include steaming, radiation, and cold/hot thermal shock. Steaming, however, still requires two cuts to remove the meat and the high temperature processes provide potential breeding ground for bacteria. Radiation is difficult to do due to the variation of shell thickness and size, and requires high temperature processing. It has also been suggested that a freeze thaw condition plus tumbling is possible to produce mollusk meat devoid of the shell. However, this latter technique would not permit producing mollusk on a half-shell or individually quick-frozen mollusks such as oysters in a single process. Moreover, prior art processes have resulted in mollusk meat that was of poor quality.

U.S. Pat. No. 3,007,801 discloses and claims a freeze-/atmospheric thaw process, subject to mechanical freezing temperatures of $-50°$ F. or higher. After treatment, the mollusk, e.g. oyster, is then severely tumbled in a partially frozen state to completely open an expel the oyster meat. In such a severe environment, the mixture of shell and meat in the tumbler has been shown to mutilate the oyster meat.

U.S. Pat. No. 2,824,006 discloses and claims a mechanical freeze/gas burner heat cycle to open oysters. The process relies upon the thermal shock effect to achieve the opening of the oyster.

U.S. Pat. No. 4,236,276 discloses a cryogenic freeze-/gas burner heat cycle to open oysters followed by the use of severe mechanical shock for separation of the meat from the shell. The oyster is sprayed with a cryogen to chill the outer surface and then by heating it is subjected to severe thermal shock.

SUMMARY OF THE INVENTION

The present invention pertains to a method and a particular apparatus for opening mollusks using only a cooling technique. The invention is characterized in that the entire mollusk, e.g. oyster, is rapidly cooled to a surface temperature at or below $-100°$ F. followed by mechanical agitation of the shell to separate only one shell from the raw oyster leaving an individually quick frozen oyster on the half-shell. In some cases, larger plumper oysters will open to a half-shell configuration with no agitation due to expansion of the oyster meat/-juice in the shell during the cooling step.

It has also been discovered that if the oyster after freezing and prior to agitation is immersed in a cold water bath for a few seconds an even better separation takes place and fewer broken edges of the shells are noted. The bath can raise the surface temperature between a few degrees above about $-100°$ F. to $-50°$ F. without adversely affecting the nature or quality of the frozen oysters.

The apparatus of the invention utilizes a bath of liquid cryogen, e.g. nitrogen, to provide the rapid cooling step and a mechanical reciprocating device such as a shaker table or shaker conveyor to provide the agitation. Alternatively, an elongated cryogenic freezing tunnel can be used between the liquid cryogen bath and the agitating device to provide for uniform equilibration of the internal temperature of the oyster.

BRIEF DESCRIPTION OF THE DRAWING

FIG. 2 is a side elevational view of an apparatus according to the present invention.

FIG. 3 is a top plan view of the apparatus of FIG. 2.

DETAILED DESCRIPTION OF THE INVENTION

Figure 1:
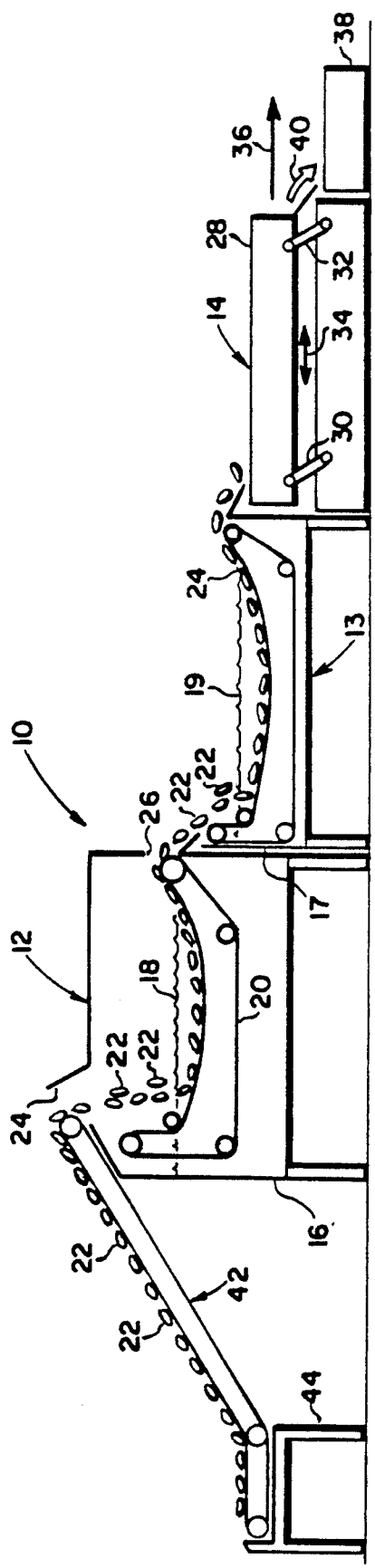
FIG. 1 is a schematic representation of an apparatus according to the present invention.

The process of the present invention subjects the whole oyster, including its shell, to the effect of a cryogen (e.g. liquified nitrogen, solid carbon dioxide, etc.) for a specified time period followed by shell agitation to open the oyster. According to the process of the present invention, a surface temperature for the oyster of $-100°$ F. or lower and preferably approximately $-100°$ F. is desired during the rapid cooling step of the process. The temperature is critical in that the surface of the oyster must reach at least about $-100°$ F. and the meat must be completely frozen. When the surface of the oyster achieves the temperature of approximately $-100°$ F., subsequent agitation either by the use of a shaker table, a shaker screen or the slight drop to a table, will cause the oyster to open, leaving an individually quick frozen oyster on the half-shell. If it is desired to separate the oyster meat from the remaining half of the shell, this can be easily accomplished by cutting the remaining eye or membrane, thus yielding an "out of the shell" oyster.

Laboratory data has shown that when the individual oysters are exposed to cryogen, preferably liquid nitrogen maintained at a temperature of −320° F. for 45-60 seconds, the ideal temperature of approximately −100° F. in the shell is achieved and the meat is frozen through. At higher temperatures of the shell and oyster (e.g. greater than −100° F.) the shell opens with more difficulty and both eyes tend to remain attached to the shells. At surface temperatures significantly colder than −100° F., the oyster shell opens with little or no effort, and in many cases both eyes separate, however, the oyster meat becomes brittle and cracks and sometimes separates into fragments. Therefore, it is essential that according to the present invention, the surface temperature of the oyster be maintained by precise control of the time-temperature regime utilizing a cryogen and opening is encouraged by light agitation after the rapid cooling step. Furthermore, it has been found that at the preferred temperature the meat could stick to the shell when exposed to humidity therefore tearing and/or cracking the meat. In those cases where excessive humidity is present in the atmosphere rapidly dipping or immersing the cooled oyster into a water bath to raise the temperature of the shell slightly to approximately −50° F., the shell separates with ease requiring even less agitation if any at all. Use of the water bath minimizes edge cracking of the shell and does not adversely affect the nature or quality of the meat. Set forth in Table I below is a series of data showing various immersion times and the results utilizing liquid cryogen.

TABLE 1

IMMERSION OF OYSTERS IN LIQUID NITROGEN (LIN) BATH

| IMMERSION TIME | COMMENTS |
| --- | --- |
| 10 min. | Opens by itself - cracked meat. |
| 1.15 min. | Opens by itself - cracked meat. |
| 30 sec. | Opens with tap of hammer - meat attached, meat split from eyes with a clean cut. |
| 60 sec. | Meat O.K. Clean separation of half of the shell with tap of hammer or two foot drop of shell. |
| 15 sec. | Opens with difficulty - meat splits without knife cut. |
| 30 sec. | Opens with two foot drop - meat tears. |
| 45 sec. | Meat O.K. - Clean separation. |

From the foregoing table it is apparent that between 45 and 60 second immersion of the whole oyster in the liquid cryogen results in clean separation of half of the shell together with the whole oyster meat.

Set forth in Table II is a series of tests conducted according to the prior art wherein the oysters were refrigerated and then subjected to a rotary tumbler action.

TABLE II

OYSTERS IN ROTARY TUMBLER

| CONDITIONS | COMMENTS |
| --- | --- |
| 60 secs. at −50° F. plus 2 min. tumble time, 10 rpm. | All oysters opened, but meat was marred on all. |
| 45 secs. at −25° F. plus 2 min. tumble time at 4 rpm. | 50% of the oysters opened. Those opened had severed meat. |
| 45 secs. at −50° F. plus 1 min. tumble time at 4 rpm. | 75% of the oysters opened, all had severed meat. |

From the foregoing Table it is apparent that the use of a rotary tumbler in combination with refrigerating the oysters results in marring of the meat resulting in a non-saleable product. The tests did show a temperature of at least −50° F. combined with a time and temperature regime was required to open the oyster shells.

In addition to the process of the present invention providing an individually quick-frozen oyster that retains its bright white color having fresh oyster look and retains it water giving the oyster a larger and more aesthetic appeal the oyster has a taste upon thawing that approaches that of the freshly opened or schucked oyster. Mechanical freezing of the oyster results in a dull white color and concomitant loss of taste.

Bacteria present on the oysters are subject to temperatures as low as −320° F. Further laboratory tests have shown that several strains of Vibrio bacteria are destroyed using the process of the present invention. Bacteria of concern in oysters are Vibrio in general and specifically *Vibrio vulnificus*. These bacteria lead to food poisoning and specifically, *Vibrio vulnificus* has been known to cause fatal illness.

In order to test for bacteria, two frozen samples (of three oysters each) were sent to an independent laboratory. These samples showed no presence of any Vibrio bacteria. A third sample consisting of three fresh oysters (refrigerated but not frozen) were tested and showed the presence of *Vibrio alginolyticus* and *Vibrio parahemolyticus*.

As another test, a fourth sample of oysters, three fresh and four frozen from the same harvest lot, were tested. The test showed that no Vibrio bacteria was present in the frozen oysters, but *Vibrio alginolyticus* and *Vibrio parahemolyticus* were present in the fresh oysters. No samples of with *Vibrio vulnificus* were obtained, but it is believed this would also be destroyed by exposing the oysters to the cryogenic temperatures.

In order to achieve the process of the present invention an apparatus such as shown in FIG. 1 can be used. Referring to FIG. 1, the processing apparatus 10 can, in one embodiment, include a rapid cooling section 12, a water bath immersion section 13, and an agitation apparatus or section 14. The rapid cooling section or apparatus 12 is in the form of an insulated outer chamber 16 adapted to contain a bath of liquid cryogen 18, e.g. a liquefied nitrogen at a temperature of −320° F. A conveyor 20 is adapted to receive oysters 22 dropped through an inlet 24 of chamber 16 into the bath 18 and convey them from the inlet section of the chamber 16 to an outlet 26 where the oysters 22 can be deposited into the water bath immersion section 13. The water bath immersion section 13 is in the form of a tub, tray, trough or container 17 adapted to contain a bath of chilled water 19 at 32° F. and a conveyor 21 to receive the oysters from rapid cooling section 12 so that the surface temperature of the oyster is raised to a level no higher than about −50° F. and then deposited by conveyor 21 into agitation device 14. Agitation device 14 can be a shaker table or conveyor 28 mounted on pivot arms 30, 32 to provide a longitudinal reciprocating motion such as shown by arrow 34. The water bath immersion section 13 can be optional depending upon the mollusks being opened. The product can be taken off the table in a continuous flow via a device (not shown) shown generally by arrow 36 and the shells without meat (shown by arrow 40) can be moved into a receptacle 38 for removal and reuse in the oyster beds or for other products.

Loading of the oysters 22 into the quick freezing section 12 can be accomplished using a food handling conveyor 42 and accessory standard or table 44 as is well known in the art.

Referring to FIGS. 2 and 3, there is shown a commercial apparatus for practicing the process of the present invention. The processing apparatus 50 includes a first or rapid cooling section 52 and equilibrating section 54 and an agitation section or station 56. The rapid cooling section 52 employs a bath of liquid cryogen with an apparatus of this type being offered for sale by Air Products and Chemicals, Inc. of Allentown, Pa. under the trademark CRYO-DIP. However, any type of cryogenic cooling apparatus can be used so long as a temperature of about −100° F. is achieved on the surface of the oyster. The immersion freezer 52 has an inlet conveyor 58 which brings the oysters from a receiving bin 60 to the inlet of the quick freezing section 62. After the oysters have moved through the liquid cryogen bath contained in the quick freezing section 52, they are passed through a cryogenic freezer 54 such as sold by Air Products and Chemicals, Inc. under the trademark CRYO-QUICK. CRYO-QUICK freezers include a plurality of sections longitudinally joined together. The sections 64, 66. 68 and 70 each include recirculating fan 72, 74, 76, 78, respectively, for withdrawing vaporized cryogen from the initial quick freezing section 52 and conducting the cryogen along the tunnel 54 to help maintain and equilibrate the temperature of the oysters at approximately between −50° F. and −100° F. The oysters are discharged from tunnel 54 through the outlet 80 onto the shaker table 56 where the mechanical action opens the shells. The product can be segregated on the shaker table with the individually quick-frozen oysters on the half-shell being removed on conveyor 82 for moving to a packing station 84. The separated shells can be removed by the discharge conveyor 90 for disposal in an environmentally acceptable manner. If desired a water bath immersion section (not shown) can be disposed between freezer 54 and shaker table 56 to further facilitate the opening of mollusks such as oysters.

Having thus described my invention, what is desired to be secured by Letters Patent of the United States is set forth in the appended claims.

I claim:

1. A method for opening a mollusk's shell to expose the meat contained therein comprising the steps of:
    rapidly cooling said mollusk to a surface temperature at or below −100° F.; and
    agitating said mollusk immediately thereafter; whereby said mollusk shell is opened without damage to said meat and at least one eye remains attached to one-half of said mollusk shell and said meat is fully frozen.

2. A method according to claim 1 wherein said mollusk is rapidly immersed in a water bath to raise the surface temperature to about −50° F. prior to agitating.

3. A method according to claim 1 wherein said rapid cooling is effected by immersing said mollusk in a bath of liquid cryogen maintained at a temperature of below −320° F.

4. A method according to claim 1 wherein said agitation step takes place by conveying said cooled mollusk to a shaker device in motion.

5. A method according to claim 4 wherein said shaker device is a moving shaker belt.

6. A method according to claim 4 wherein said shaker device is a shaker table.

7. A method according to claim 1 wherein said mollusk is an oyster.

8. A method of preparing an opened individually quick frozen mollusk comprising the steps of:
    rapidly cooling said mollusk to a uniform shell and meat temperature of about −100° F. while freezing said mollusk meat; and
    mechanically agitating said mollusk to cause said shell to open leaving said meat fully frozen and attached by one eye and to at least one-half of said mollusk shell.

9. A method according to claim 8 wherein said mollusk is rapidly immersed in a water bath to raise the surface temperature to about −50° F. prior to mechanically agitating.

10. A method according to claim 8 wherein said rapid cooling is effected by immersing said mollusk in a liquid cryogen at a temperature of −320° F. for at least 45 seconds.

11. A method according to claim 10 wherein said cryogen is liquid nitrogen.

12. A method of preparing individually quick frozen oysters on the half-shell comprising the steps of:
    rapidly cooling said oyster to a surface temperature at or below −100° F.,
    immediately thereafter mechanically agitating said oyster to cause said shell to open and at least one eye of said oyster to separate from one of said oyster shells; and
    removing one-half of said shell yielding fully frozen oyster meat on the other half of said shell.

13. A method according to claim 12 wherein said oyster is rapidly immersed in a water bath to raise the surface temperature to about −50° F. prior to mechanically agitating.

14. A method according to claim 12 wherein said rapid cooling is effected by immersing said whole oyster in a bath of liquid cryogen maintained at a temperature at or below −320° F.

15. A method according to claim 14 wherein said cryogen is liquid nitrogen.

16. A method according to claim 12 wherein said mechanical agitation is effected by causing said rapidly cooled oyster to be deposited on a hard surface by dropping.

17. A method according to claim 12 wherein said mechanical agitation is effected by moving said rapidly cooled oyster onto a shaker table or shaker belt.

* * * * *